United States Patent Office 2,810,765
Patented Oct. 22, 1957

2,810,765

4-THIOL-6-T-BUTYL-ORTHO-CRESOL AND METHOD OF PREPARATION

Martin B. Neuworth and Eric B. Hotelling, Pittsburgh, Pa., assignors to Pittsburgh Consolidation Coal Company, Pittsburgh, Pa., a corporation of Pennsylvania No Drawing. Application April 12, 1956,
Serial No. 577,648

2 Claims. (Cl. 260—609)

The present invention relates to a new compound 4-thiol-6-t-butyl-ortho-cresol and its method of preparation.

The compound has the following structural formula:

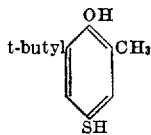

It is a liquid at room temperature and colorless when freshly distilled. It has a boiling point of 134–5° C. at 5 mm. Hg. It dissolves readily in strong bases such NaOH and KOH and reprecipitates in dilute acid such as sulfuric, hydrochloric, nitric, phosphoric, and acetic. It is generally soluble in organic solvents such as methanol, ethanol, benzene, toluene, 1,4-dioxane, diethyl ether, acetone, n-hexane, carbon tetrachloride and the like.

The compound has useful properties as an anti-oxidant for organic material such as oils, gasoline, rubber, fats and the like. It is particularly useful as an inhibitor for polymerizable ethylenically unsaturated monomers. This type of monomer is used as a starting material for the preparation of vinyl polymers such as polystyrene, acrylates, methacrylates, alkyds, vinyl chlorides, vinyl acrylates and the like. It is customary to add polymerization inhibitors to the polymerizable ethylenically unsaturated monomers to avoid premature deleterious polymerization in storage. Perhaps the most widely used inhibitors for this purpose are 4-t-butyl catechol and hydroquinone.

The new compound, 4-thiol-6-t-butyl-ortho-cresol, exhibits polymerization inhibiting properties superior to those of the commercially used inhibitors and also superior to the corresponding property of its homologs and isomers.

The new compound can be prepared from ortho-cresol as a starting material through three successive reactions. In the first reaction, ortho-cresol is butylated with isobutylene in the presence of a strong acid catalyst as described in U. S. patent application 557,544, filed on January 5, 1956 and assigned to the assignee of the present invention.

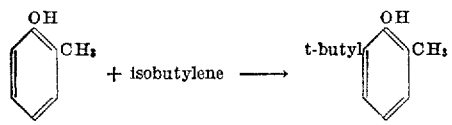

The product of this reaction, 6-t-butyl-ortho-cresol, thereupon is sulfurized by treatment with sulfur monochloride under anhydrous conditions at room temperature in the absence of catalyst. Elevated temperatures and catalysts would tend to favor chlorination reactions which would decrease the yield of polysulfides of the 6-t-butyl-ortho-cresol.

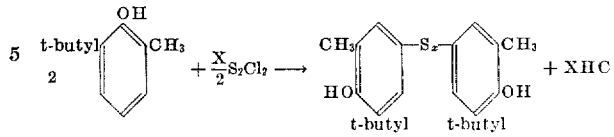

The polysulfides produced in the second stage reaction can be subjected to hydrogenation in the presence of a sulfactive catalyst, such as molybdenum sulfide, for reduction to the desired compound, 4-thiol-6-t-butyl-ortho-cresol.

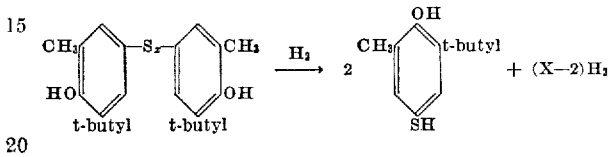

EXAMPLE

Ortho-cresol was butylated with isobutylene in the presence of an acid catalyst as described in U. S. patent application 557,544 to produce 6-t-butyl-ortho-cresol. 429 grams (3.0 mols) of pure 6-t-butyl-ortho-cresol were dissolved in 2.5 liters of carbon tetrachloride. The solution was placed in a 5 liter, 5 neck, round bottom flask equipped with a heating mantle, motor stirrer, thermometer well, gas inlet tube, reflux condenser surmounted by a drying tube and a dropping funnel with a pressure equalizing side arm. Dry nitrogen gas was bubbled through the stirred solution while 222 grams (1.65 mols) of sulfur monochloride (technical grade—Mathieson Chemical Corporation) were added slowly through the dropping funnel with continued efficient stirring and nitrogen sweeping. The sulfur monochloride was added at such a rate that the reaction temperature did not exceed 30° C. About one hour was required for the addition. When the addition was completed, the solution was heated to reflux temperature, i. e., the temperature of boiling carbon tetrachloride at 1 atmosphere, and held at this temperature with continued stirring and nitrogen sweeping for 10 minutes. Thereupon, the reaction mixture was allowed to cool to room temperature.

The flask contained crude polysulfides of 6-t-butyl-ortho-cresol. This material was freed of solvent by distillation under vacuum with a water aspirator to a final temperature of 120° C. in the flask. The dark viscous residue weighed 656.5 grams. About 400 ml. of toluene was added to the flask to decrease the viscosity of the contents. The toluene solution was hydrogenated in a stainless steel stirred autoclave with 169.5 grams of a commercial sulfactive catalyst (Davison Chemical Company, catalyst number TS–55–3668) which comprises 20 percent molybdenum disulfide supported on alumina pellets. The weight of molybdenum disulfide employed was equal to about 5 percent of the weight of the polysulfide present. Hydrogenation proceeded readily at 160 to 168° C. at an average hydrogen partial pressure of 850 p. s. i. g. and was continued until no further gas absorption was observed.

The hydrogenated material was cooled to room temperature and filtered to remove the spent catalyst. The filtrate was fractionated in vacuo in a Vigreaux column. The recovered solvent was removed at a pressure of 200 mm. Continuing distillation yielded the following materials at a pressure of 5 mm.:

315.7 grams of forerun, boiling range 68–134° C. This forerun fraction contained 35.1 grams of 4-thiol-6-t-butyl-ortho-cresol.

127.5 grams of analytically pure 4-thiol-6-t-butyl-ortho-cresol, boiling range 134–5° C.

Finally a higher boiling fraction was distilled at a pressure estimated at 0.3 mm. This fraction boiled in the range 98–205° C. and weighed 87.1 grams. Infrared analysis demonstrated the presence of 45.0 grams of 4-thiol-6-t-butyl-ortho-cresol in this fraction.

Thus the total amount of desired product in the distillate was 207.6 grams which is 35 percent of the theoretical yield. The forerun fraction also contained 45.0 grams of 6-t-butyl-ortho-cresol, available for reuse. The other products of process included varying amounts of ortho-cresol, 4-t-butyl-ortho-cresol, 4,6 di-tertiary-butyl-ortho-cresol and chlorinated compounds. The 4-t-butyl-ortho-cresol results from isomerization of the starting phenol. The ortho-cresol and 4,6-di-t-butyl-ortho-cresol result from disproportationation of the starting phenol. By calculating the yield of 4-thiol-6-t-butyl-ortho-cresol on the basis of 6-t-butyl-ortho-cresol actually consumed, the desired product was obtained in a 38 percent yield.

An elementary analysis for the 4-thiol-6-t-butyl-ortho-cresol can be calculated from the empirical formula $C_{11}H_{16}OS$ (mol. wt.—196.3) as C, 67.29 percent; H, 8.22 percent; S, 16.33 percent. Actual elementary analysis of the product showed: C, 67.26 percent; H, 8.21 percent; S, 16.34 percent.

Derivatives of the compound 4-thiol-6-t-butyl-ortho-cresol were prepared by allowing the material to react with excess bromoacetic acid and sodium hydroxide in an aqueous solution, refluxed for thirty minutes.

After acidification, a white precipitate of crude 2-methyl-6-t-butyl-4-(carboxymethylthio)-phenoxyacetic acid was dissolved in isopropyl alcohol, reprecipitated with diethyl ether, dried to constant weight in vacuo at 60° C., melted at 118–120° C. (corrected, with decomposition). The product was analytically pure. Its theoretical elementary analysis can be calculated for $C_{15}H_{20}O_5S$ (mol. weight—312.4): C, 57.66; H, 6.45; S, 10.27. The actual elementary analysis showed the following results: C, 58.01; H, 6.97; S, 10.08.

To illustrate the effectiveness of 4-thiol-6-t-butyl-ortho-cresol as an inhibitor for polymerizable ethylenically unsaturated monomers, tests were conducted with commercial styrene, a typical polymerizable ethylenically unsaturated monomer, in a constant temperature bath. The commercial styrene was extracted with caustic to remove the commercial inhibitor, washed with water, dried with calcium sulfate and filtered. The viscosity of the freshly prepared styrene was tested at 50° C. in a Saybolt-Furol cup. The number of seconds required for efflux of 60 ml. of sample was selected as the criterion of viscosity, hence a criterion of degree of polymerization which exists in the polymerizable solution. The freshly prepared styrene required 8 seconds in the Saybolt-Furol cup viscosity determination.

Ten samples (100 ml. each) of the prepared styrene were treated with 1 percent by weight of benzoyl peroxide, a conventional polymerization catalyst, to accelerate polymerization. The samples, designated by the letters A through J, were treated with 0.1 percent by weight of the polymerization inhibitor designated in the following Table I. The samples were immersed for 23 hours in a constant temperature bath at 50° C. and the viscosity of each solution was measured therefter with a Saybolt-Furol cup at 50° C. The efflux time for 60 ml. of each sample also is recorded in Table I.

*Table I*

| Run Designation | Inhibitor | Viscosity, Saybolt-Furol, Seconds |
|---|---|---|
| A | None | 140 |
| B | 4-t-butyl catechol | 16 |
| C | 4-thiolphenol | 11 |
| D | 4-thiol-2,6-di-isopropylphenol | 11 |
| E | 4-thiol-2,6-di-t-butylphenol | 12 |
| F | 4-thiol-6-t-butyl-o-cresol (Fresh) | 9 |
| G | 4-thiol-6-t-butyl-o-cresol (Stored 17 months) | 10.5 |
| H | 4-thiol-2,6-xylenol | 13.5 |
| I | 4-thiol-ortho-cresol | 3 |
| J | 4-thiol-2-t-amylphenol | 21 |

The sample containing no inhibitor, Sample A, showed that considerable polymerization had occurred during the test period. The styrene viscosity had increased from its initial value of 8 seconds to a final value of 140 seconds.

The standard commercially-used inhibitor, 4-t-butyl catechol, inhibited the polymerization by allowing the styrene viscosity to increase from 8 to a final value of 16 seconds.

The 4-thiol-6-t-butyl-ortho-cresol employed in Run F had been freshly prepared as described. Its effectiveness as an inhibitor is quite striking since the styrene viscosity increased only from its initial value of 8 to a final value of 9 seconds. A second sample of 4-thiol-6-t-butyl-ortho-cresol which had been stored for 17 months prior to tests illustrated the compound retained its inhibiting properties over extended periods of time. The styrene viscosity increased from its initial value of 8 to a final value of 10.5 with this stored compound as the inhibitor.

The other remaining samples illustrate the effectiveness of other mono-ortho-alkylated and di-ortho-alkylated thiohydroquinones.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. 4-thiol-6-t-butyl-ortho-cresol.

2. The method of preparing 4-thiol-6-t-butyl-ortho-cresol which comprises sulfurizing 6-t-butyl-ortho-cresol with sulfur monochloride to prepare polysulfides of 6-t-butyl-ortho-cresol, hydrogenating said polysulfides in the presence of molybdenum sulfide catalyst and recovering from the hydrogenated polysulfides 4-thiol-6-t-butyl-ortho-cresol.

No references cited.

UNITED STATES PATENT OFFICE

CERTIFICATE OF CORRECTION

Patent No. 2,810,765                           October 22, 1957

Martin B. Neuworth et al.

It is hereby certified that error appears in the printed specification of the above numbered patent requiring correction and that the said Letters Patent should read as corrected below.

Column 2, line 6, extreme right-hand portion of the equation, for $$+ \text{ XHC read} + \text{XHCl}$$

same column, line 17, extreme right-hand portion of the equation, for $$+ (X-2)H_2 \text{ read } + (X-2)H_2S$$

Signed and sealed this 21st day of January 1958.

(SEAL)
Attest:
KARL H. AXLINE
Attesting Officer

ROBERT C. WATSON
Commissioner of Patents